April 7, 1936.  L. O. B. LINDSTROM ET AL  2,036,762
MILK BOTTLE SIGNAL AND ORDERING DEVICE
Filed Aug. 25, 1934
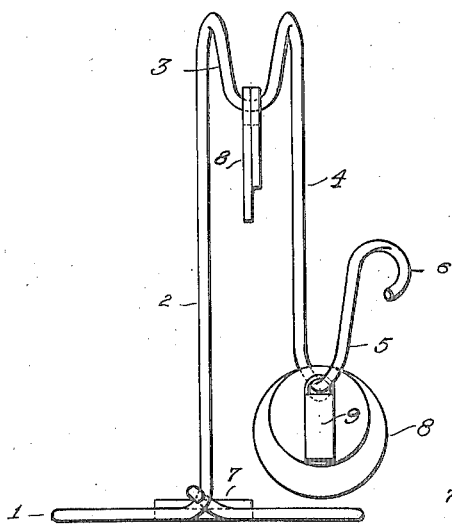
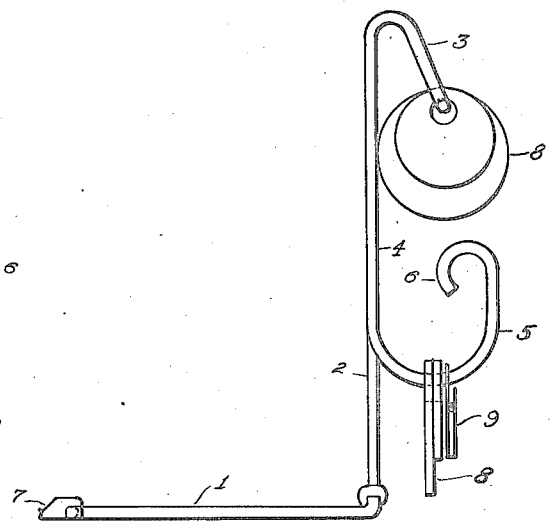
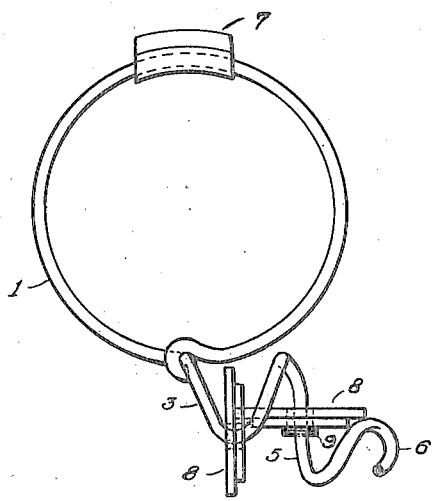
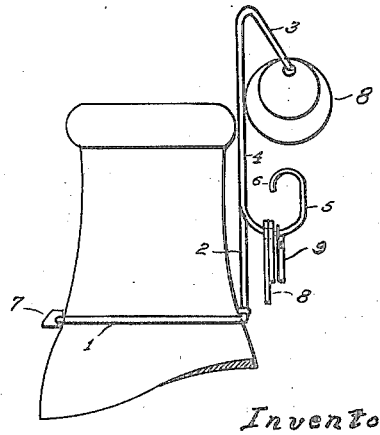
Inventors
Linn Olaf B. Lindstrom
Elizabeth Sue Lindstrom Patented Apr. 7, 1936

2,036,762

UNITED STATES PATENT OFFICE 2,036,762

MILK BOTTLE SIGNAL AND ORDERING DEVICE

Linn Olaf B. Lindstrom and Elizabeth Sue Lindstrom, San Francisco, Calif.

Application August 25, 1934, Serial No. 741,488

3 Claims. (Cl. 40—19.5)

Our invention relates to a signal and ordering device by means of which dairy and other products can be conveniently ordered, notes and checks left for the delivery man, and signals left for him as to just what amount of milk and other products should be left that day.

One form of the invention is illustrated in the accompanying drawing in which Figure 1 is a front view of the device, Figure 2 a side view, Figure 3 a top view and Figure 4 shows how the device can be placed on a milk bottle.

The device can be made of wire or other suitable material bent or formed in a circle 1 to fit over a milk bottle, an upright part 2, a signal holding loop 3, a part 4, a storage or receptacle loop 5, and a catch loop 6. The part 7 is a weighted flattened section to help balance the device and provide a means of placing an identification number or name.

The tags 8 having marked on them such designations as, one pint milk, one quart milk, one pint cream, one gill cream, one pound butter, one dozen eggs, one package cheese, etc., can preferably be of different sizes and colors for the different quantities and products.

The signal loop 3 holds the tags 8 that are placed there to indicate the products desired that day. The storage or receptacle loop 5 simply holds the tags 8 not being used in the signal loop 3. The catch loop 6 prevents tags from easily slipping out of loop 5.

A clip or clips 9 is provided to hold miscellaneous messages, envelopes with money, checks, etc.

We claim:
1. A milk bottle signal and ordering device comprising a single continuous piece of wire bent to form a circular portion adapted to be slipped over the neck of a bottle and rest in a horizontal plane on a bulge adjacent the neck and constituting a support portion, the wire continuing upwardly from the support portion in a direction perpendicular to the plane thereof to form a spacing portion and merging into a U-shaped signal portion lying in a plane extending downwardly and at an angle to the spacing portion, a second spacing portion extending downwardly from the U-shaped portion and merging into one arm of a U-shaped storage portion, the storage portion lying in a plane substantially perpendicular to that of the signal portion, and indicating elements having supporting holes and slidably mounted on the device and adapted to hang from the storage and signal portions, the planes of the signal and storage portions being so related that the indicating elements thereon hang in planes substantially perpendicular to each other.

2. A structure as set forth in claim 1 in which the support portion continues into a loop to prevent the indicating elements from accidentally slipping off the device.

3. A structure as set forth in claim 1 including a counterweight fixed to the support portion to balance the weight of the indicating elements and to make the device self-supporting when not on a bottle, and also adapted to serve as a nameplate base.

LINN OLAF B. LINDSTROM.
ELIZABETH SUE LINDSTROM.